US011199173B2

(12) United States Patent
Mattiazzo et al.

(10) Patent No.: US 11,199,173 B2
(45) Date of Patent: Dec. 14, 2021

(54) SYSTEM FOR GENERATING ELECTRICAL ENERGY FROM THE WAVE MOTION OF THE SEA

(71) Applicants: POLITECNICO DI TORINO, Turin (IT); MASSACHUSETTS INSTITUTE OF TECHNOLOGY, Cambridge, MA (US); WAVE FOR ENERGY S.R.L., Turin (IT)

(72) Inventors: Giuliana Mattiazzo, Turin (IT); Giacomo Vissio, Fossano (IT); Biagio Passione, Turin (IT); Sergej Antonello Sirigu, Turin (IT); Nicola Pozzi, Turin (IT); Giovanni Bracco, Turin (IT); Stefano Brizzolara, Blacksburg, VA (US); Andrea Gulisano, Pinerolo (IT)

(73) Assignees: POLITECNICO DI TORINO, Turin (IT); MASSACHUSETTS INSTITUTE OF TECHNOLOGY, Cambridge, MA (US); WAVE FOR ENERGY S.R.L., Turin (IT)

( * ) Notice: Subject to any disclaimer, the term of this patent is extended or adjusted under 35 U.S.C. 154(b) by 0 days.

(21) Appl. No.: 16/769,631

(22) PCT Filed: Dec. 6, 2017

(86) PCT No.: PCT/IB2017/057680
§ 371 (c)(1),
(2) Date: Jun. 4, 2020

(87) PCT Pub. No.: WO2019/111040
PCT Pub. Date: Jun. 13, 2019

(65) Prior Publication Data
US 2021/0164434 A1  Jun. 3, 2021

(51) Int. Cl.
*F03B 13/20* (2006.01)
*F03B 15/02* (2006.01)
*H02K 7/18* (2006.01)

(52) U.S. Cl.
CPC .............. *F03B 13/20* (2013.01); *F03B 15/02* (2013.01); *H02K 7/1892* (2013.01); *F05B 2220/706* (2013.01); *F05B 2250/44* (2020.08)

(58) Field of Classification Search
CPC ....... F03B 13/20; F03B 15/02; H02K 7/1892; F05B 2220/706; F05B 2250/44
(Continued)

(56) References Cited

U.S. PATENT DOCUMENTS 3,231,749 A * 1/1966 Hinck, III ............ H02K 7/1853
290/53
4,110,630 A * 8/1978 Hendel .................. H02K 35/02
290/53
(Continued)

FOREIGN PATENT DOCUMENTS

CN   102032094 B   11/2012
EP      2438293 B1    5/2013
(Continued)

OTHER PUBLICATIONS

International Search Report and Written Opinion of the International Searching Authority for International Application No. PCT/IB2017/057680 dated Aug. 3, 2018.

*Primary Examiner* — Pedro J Cuevas
(74) *Attorney, Agent, or Firm* — Heslin Rothenberg Farley & Mesiti P.C.; Victor A. Cardona, Esq.

(57) ABSTRACT

A system for generating electrical energy from the wave motion of the sea is provided with electrical-energy generating means for exploiting the wave motion of the sea in order to generate electrical energy. A floating body is pro-
(Continued)

vided with equipment designed to regulate the frequency of the resonance peak of the system.

10 Claims, 5 Drawing Sheets

(58) Field of Classification Search
USPC .............................................. 290/43, 53, 54
See application file for complete search history.

(56) References Cited

U.S. PATENT DOCUMENTS

| | | | | |
|---|---|---|---|---|
| 4,352,023 A * | 9/1982 | Sachs | F03B 13/20 |
| | | | 290/42 |
| 4,392,061 A * | 7/1983 | Dubois | F03B 13/22 |
| | | | 290/53 |
| 6,229,225 B1 * | 5/2001 | Carroll | F03B 13/189 |
| | | | 290/53 |
| 7,003,947 B2 * | 2/2006 | Kanki | F03B 13/20 |
| | | | 60/398 |
| 7,105,939 B2 * | 9/2006 | Bednyak | B63J 3/04 |
| | | | 290/42 |
| 7,239,038 B1 * | 7/2007 | Zimmerman | F03G 7/08 |
| | | | 290/54 |
| 7,375,436 B1 * | 5/2008 | Goldin | F03B 13/14 |
| | | | 290/42 |
| 7,453,165 B2 * | 11/2008 | Hench | F03B 13/20 |
| | | | 290/53 |
| 7,629,704 B2 * | 12/2009 | Hench | F03B 13/20 |
| | | | 290/53 |
| 7,737,569 B2 * | 6/2010 | Hench | F03B 13/20 |
| | | | 290/42 |
| 7,989,975 B2 * | 8/2011 | Clement | F03B 13/20 |
| | | | 290/53 |
| 8,004,104 B2 * | 8/2011 | Hench | F03B 13/20 |
| | | | 290/53 |
| 8,046,108 B2 * | 10/2011 | Hench | F03B 13/20 |
| | | | 700/286 |
| 8,129,854 B2 * | 3/2012 | Patten | F03B 13/20 |
| | | | 290/53 |
| 8,264,093 B2 * | 9/2012 | Moore | B63B 35/44 |
| | | | 290/42 |
| 8,269,365 B2 * | 9/2012 | Clement | F03B 13/20 |
| | | | 290/53 |
| 8,334,611 B2 * | 12/2012 | Shreider | F03B 17/06 |
| | | | 290/53 |
| 8,614,521 B2 * | 12/2013 | Babarit | F03B 15/00 |
| | | | 290/53 |
| 8,915,077 B2 * | 12/2014 | Paakkinen | F03B 13/20 |
| | | | 60/499 |
| 9,297,351 B2 * | 3/2016 | Siegel | F03B 13/183 |
| 9,563,203 B2 * | 2/2017 | Davoodi | B63B 22/20 |
| 10,067,507 B2 * | 9/2018 | Davoodi | B63G 8/001 |
| 10,167,843 B2 * | 1/2019 | Foster | F03B 13/20 |
| 10,183,400 B2 * | 1/2019 | Trigui | B63G 8/42 |
| 10,190,568 B2 * | 1/2019 | Gregory | F03B 13/18 |
| 10,240,575 B2 * | 3/2019 | Dragic | F03B 13/186 |
| 10,253,747 B2 * | 4/2019 | Shepsis | C25B 1/04 |
| 10,369,705 B2 * | 8/2019 | Trigui | G01B 17/02 |
| 10,370,905 B2 * | 8/2019 | Bech | B63B 21/50 |
| 10,767,618 B2 * | 9/2020 | Lehmann | F03B 13/20 |
| 10,947,951 B2 * | 3/2021 | Vamvas | F03B 13/18 |
| 10,988,211 B2 * | 4/2021 | Moffat | F03D 9/25 |
| 2008/0093858 A1 * | 4/2008 | Hench | F03B 13/20 |
| | | | 290/53 |
| 2008/0224472 A1 * | 9/2008 | Bean | F03G 3/00 |
| | | | 290/42 |
| 2009/0008942 A1 * | 1/2009 | Clement | F03B 13/20 |
| | | | 290/53 |
| 2009/0127856 A1 * | 5/2009 | Hench | F03B 13/20 |
| | | | 290/42 |
| 2009/0309366 A1 * | 12/2009 | Moore | F03B 13/1845 |
| | | | 290/53 |
| 2011/0089690 A1 * | 4/2011 | Babarit | F03B 15/00 |
| | | | 290/42 |
| 2011/0265468 A1 * | 11/2011 | Paakkinen | F03B 13/20 |
| | | | 60/499 |
| 2012/0292910 A1 * | 11/2012 | Moore | F03B 13/1845 |
| | | | 290/53 |
| 2013/0127168 A1 * | 5/2013 | Dragic | F03B 13/186 |
| | | | 290/53 |
| 2014/0042748 A1 * | 2/2014 | Siegel | F03B 13/183 |
| | | | 290/53 |
| 2015/0000263 A1 * | 1/2015 | Foster | F03B 13/1885 |
| | | | 60/504 |
| 2015/0344109 A1 * | 12/2015 | Davoodi | B63B 22/02 |
| | | | 367/5 |
| 2015/0346726 A1 * | 12/2015 | Davoodi | B63G 8/001 |
| | | | 701/21 |
| 2017/0226984 A1 * | 8/2017 | Gregory | F03B 15/02 |
| 2018/0079475 A1 * | 3/2018 | Trigui | B08B 1/00 |
| 2019/0003448 A1 * | 1/2019 | Shepsis | C25B 1/04 |
| 2019/0048668 A1 * | 2/2019 | Bech | B63B 21/20 |
| 2019/0111572 A1 * | 4/2019 | Trigui | B63G 8/42 |
| 2019/0285044 A1 * | 9/2019 | Dragic | F03B 13/1855 |
| 2019/0344452 A1 * | 11/2019 | Trigui | G01N 29/04 |
| 2021/0207570 A1 * | 7/2021 | Farb | F03B 13/20 |
| 2021/0214916 A1 * | 7/2021 | Kodaira | E02F 3/8858 |

FOREIGN PATENT DOCUMENTS

| | | |
|---|---|---|
| EP | 2764236 B1 | 12/2017 |
| GB | 2200694 A | 8/1988 |
| JP | 2016094902 A | 5/2016 |
| WO | 2006043086 A1 | 4/2006 |
| WO | 2007065121 A1 | 6/2007 |

* cited by examiner

SYSTEM FOR GENERATING ELECTRICAL ENERGY FROM THE WAVE MOTION OF THE SEA

CROSS REFERENCE TO RELATED APPLICATION

This application is a national stage filing under section 371 of International Application PCT/IB2017/057680, filed on Dec. 6, 2017, published in English on Jun. 13, 2019 as WO 2019/111040 A1. The entire disclosure of WO 2019/111040 A1 is hereby incorporated herein by reference.

FIELD OF THE INVENTION

The present invention relates to a system for generating electrical energy from the wave motion of the sea.

In particular, the system described herein is of the type comprising:
- a floating body; and
- an electrical-energy generating device which is set on said floating body, and which comprises a body that is configured to move as a result of the oscillation of said floating body about said main axis, and electric-generating means configured to generate electrical energy as a result of the movement of said body.

PRIOR ART

Systems of the type in question exploit the oscillatory motion of the sea to transfer its kinetic energy to the electrical-energy generating device and then convert it through the electric-generating means, into electrical energy.

Some known systems of this type have electrical-energy generating device provided with gyroscopic structure.

The present applicant in the past has proposed different solutions of systems of this type, which envisage particular configurations of the gyroscopic structure and of the electric-generating means associated thereto, to render conversion of the kinetic energy accumulated in the gyroscopic structure into electrical energy as efficient as possible.

In this connection, the Italian patent No. IT1386755 describes a gyroscopic structure with two degrees of freedom, for systems of the type in question, associated to which are electric-generating means of a linear type that engage the various oscillating frames of the structure and are directly moved by them.

The European patent No. EP2438293, filed in the name of one of the present applicants, describes, instead, a gyroscopic structure that carries on it, in a perfectly integrated way, the electric-generating means. In particular, this structure comprises, in its main planes of oscillation, pairs of frames of a circular shape, concentric and mobile in rotation with respect to one another, arranged on which are the windings and the magnetic bodies that constitute the electric-generating means of the system.

Again, the document No. EP2764236, which is also filed in the name of one of the present applicants, describes a system for generating electrical energy from the wave motion of the sea that is equipped with a gyroscopic structure with one degree of freedom, and which envisages a type of control whereby, in operation, the frame of this structure on which the rotor is carried performs a continuous movement of rotation instead of a movement of oscillation.

Other known systems of the type in question have electrical-energy generating device provided with pendulum-like structure or with rotary structure.

OBJECT OF THE INVENTION

In general, already known in this field is the possibility of regulating the parameters of the generating system as a function of the conditions of the sea, but basically in order to activate production of electrical energy only when the external conditions enable an operation of the system that is on average efficient; for example, it is known to interrupt connection of the electric-generating means with the grid that stores electrical energy when the wave motion presents oscillations of an amplitude lower than a given threshold.

So far, known systems do not envisage, instead, any regulation in the perspective of improving the overall capacity of the system of generating electrical energy.

In this context, the object of the present invention is to provide a system that is able to operate efficiently in various conditions of the sea, that differ even considerably from one another.

The above object is achieved via a system that presents the characteristics of claim 1. The claims form an integral part of the technical teaching provided herein in relation to the invention.

SUMMARY OF THE INVENTION

As will be seen in detail in what follows, the system described herein is characterized in that it is able to adapt its own oscillatory behaviour to the conditions of the sea.

In particular, in the system described herein, the floating body comprises equipment configured for varying the frequency of the resonance peak of the system with respect to a movement of oscillation performed by the floating body about a main axis of oscillation thereof, and moreover the system comprises a control unit configured for controlling the above equipment so as to regulate the frequency of the resonance peak towards or on a value substantially corresponding to the frequency of oscillation of the wave motion of the sea.

As is known, the resonance frequency of a forced vibrating system, also referred to as "natural frequency", is a value typical of inertial dynamic systems, that once excited by an oscillatory forcing with that particular frequency, show a maximum response amplitude. While resonance frequency is measured in Hz, the resonance period is the inverse of the resonance frequency and it is measured in seconds.

It may hence be understood that, thanks to the characteristics referred to above, whereby the resonance frequency of the system is substantially made to correspond to the frequency of oscillation of the wave motion, the system described herein can be kept in a condition where it is able to express an oscillatory motion characterized by an amplitude equal to or in any case approaching the maximum amplitude that can be derived from the wave motion present, this applying to all the various conditions of the sea that may present during operation of the system.

DETAILED DESCRIPTION OF SOME EMBODIMENTS

Further characteristics and advantages of the invention will emerge clearly from the ensuing description with reference to the annexed drawings, which are provided purely by way of non-limiting example and in which.

In the ensuing description, various specific details are illustrated aimed at providing an in-depth understanding of the embodiments. The embodiments may be implemented without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As mentioned above, the system described herein is a system for generating electrical energy from the wave motion of the sea, which is provided with an electrical-energy generating device for exploiting the wave motion of the sea in order to generate electrical energy.

In general, the system described herein, designated in the figures as a whole by the reference number 10, comprises:
  a floating body 2; and
  an electrical-energy generating device which is set on the floating body, and which comprises a body that is configured to move as a result of the oscillation of said floating body about said main axis, and electric-generating means configured to generate electrical energy as a result of the movement of said body.

In preferred embodiments, the electrical-energy generating device is provided with a gyroscopic structure 4 set on the body 2, which comprises a frame 41 rotatably mounted on the floating body so that it can rotate about a first axis of rotation I and carrying a rotor R, which is in turn rotatable about a second axis of rotation II.

Connected to the frame 41 are electric-generating means G designed to generate electrical energy as a result of rotation of the frame.

In various preferred embodiments, as in the one illustrated, the floating body 2 is specifically prearranged for oscillating about a main axis of oscillation, which, in the embodiment illustrated, is identified by the axis P.

This means that, in operation, the body 2 will present a preferential orientation with respect to the wave front, in which it will be kept with the aid of an anchoring system, such as the one illustrated in FIG. 7, which will be described hereinafter. It should be noted that the floating body 2 can operate both in a floating condition at the water-surface level and in a submerged condition.

Figure 4:
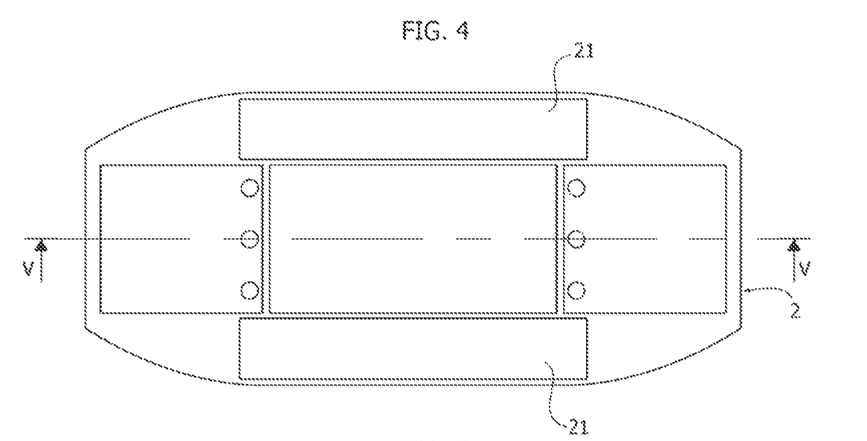
FIG. 4 is a plan view of the floating body of a preferred embodiment of the system.
Figure 5:
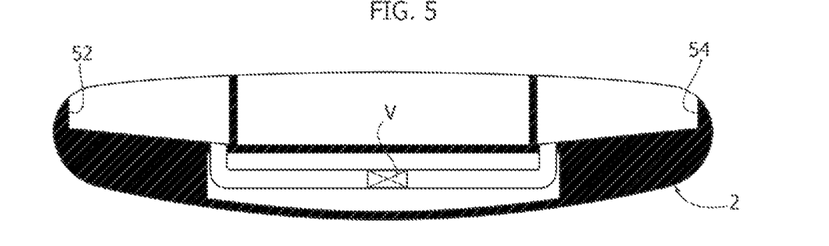
FIG. 5 is a cross-sectional view of the floating body, according to the plane of section V-V represented in FIG. 4.

The body 2 is equipped with a hull characterized by shape, dimensions, and distribution of the weight purposely designed for rendering it specifically configured for oscillating about the aforesaid main axis of oscillation P. The general principles for designing a hull in this perspective are in themselves already known in the art and consequently will not be described in detail herein in order not to dwell excessively on the present description, but rather to highlight immediately the innovative aspects of the solution. It should here simply be noted, with reference to the embodiment illustrated in the figures (see FIG. 4), that the body 2 may present appropriate chambers 21 designed to be filled with a ballast, for example water, sand, etc., for adjusting the floating portion of the system installed, as well as its overall mass in order to bestow thereon the desired inertia.

As mentioned above, in the system described herein, the floating body 2 comprises equipment designed to vary the frequency of the resonance peak of the system, in particular with respect to the movement of oscillation of the body 2 about the main axis P.

In various preferred embodiments, as in the one illustrated, the equipment in question comprises, in particular, a first chamber 52 and a second chamber 54, which are positioned on the body 2 respectively at the bow and at the stern, i.e., at the opposite sides of the axis of oscillation P, which are hydraulically connected to one another and are designed to receive a given volume of liquid, for example seawater.

The hydraulic connection between the two chambers causes, as a result of oscillation of the body 2, a flow of liquid, having alternating motion, from one chamber to the other.

The equipment further comprises a device designed to control the above flow, interrupting it or varying the rate thereof.

It should now be noted that the variation of the frequency of the resonance peak of the system allowed by the equipment in question is obtained through variation of the rate of the flow between the chambers 52 and 54, as will be illustrated hereinafter with reference to FIG. 3.

Figure 3:
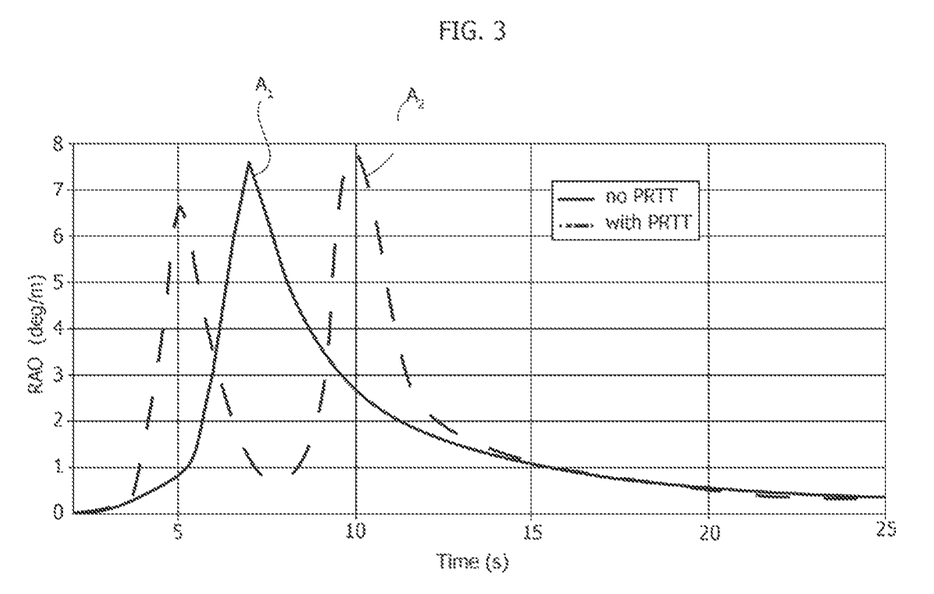
FIG. 3 represents a diagram illustrating the dynamic response of the system as a function of the external forcing for two different operating modes of the system.

FIG. 3 illustrates two different curves of the amplitude of oscillation of the system, as a function of the period of oscillation, which are characteristic, one of a state of operation of the system in which the flow of liquid referred to is zero (curve A1), and the other of a state of operation in which this flow is instead present and is equal to a generic value other than zero (curve A2).

As may be seen, each curve identifies one or more specific resonance periods (or frequencies), corresponding to the single peak or multiple peaks of the curve, respectively; in particular, it may be noted that the curve A2 identifies two different resonance periods. Consequently, according to the example illustrated, when the flow is equal to zero, the system will present the resonance period of the curve A1, whereas in the presence of the flow, the system will present the two resonance periods of the curve A2.

Now, as a function of what is the period of oscillation of the forcing load due to the wave motion of the sea, the system described herein can hence provide a control carried out through the regulation equipment described in order to assume a resonance period equal or in any case as close as possible to the forcing period of the wave motion.

In the light of what has been said above, this will enable the system to maximize the oscillation amplitude of the response, obviously relative to the amplitude of the wave front.

By way of example, with reference to the specific example of FIG. 3, in a condition where the forcing wave load has a period of oscillation of 7 s, the system of this example will hence provide a control in which the flow between the two chambers of the equipment is blocked so as to operate according to the characteristic curve A1, which defines the resonance peak period at 7 s. In a condition, instead, where the period of oscillation of the wave motion is 10 s, the system will regulate the flow between the two chambers so as to operate according to the curve A2, the resonance peak of which is exactly at 10 s.

Once again with reference to FIG. 3, it may now in general be noted, aside from the specific values represented in this figure, that the more the average flow rate between the two chambers increases, the more the two peaks of the curve A2 move away from one another and, conversely, the more the flow rate decreases, the more the two peaks approach one another, until they coincide in the curve A1 when the flow becomes equal to zero.

The present applicant has found that, by controlling the flow rate of ballast fluid in question, it is possible to vary the resonance period, inverse of the frequency, by a value in the order of seconds.

The device mentioned above, designed to regulate the flow of liquid between the two chambers 52 and 54, may be constituted by a valve located directly on the duct for connection between the two chambers, for example a sectioning valve designed to vary its section of flow from a zero value to a maximum value. In alternative embodiments, the above device may instead be represented by a valve, which is directly associated to each chamber, preferably set in its top part, and controls communication of the chamber with the external atmospheric pressure; this valve blocks the flow in question setting the respective chamber in a condition of negative pressure.

Moreover, the equipment in question may comprise, for each chamber or only for one of the two chambers, a device designed to vary the level of the liquid within the two chambers by taking liquid from outside or emptying on the outside the liquid contained therein. Also this modification of the state of the system has the effect of producing a variation in the resonance frequency of the system, and the also above device may hence intervene to make the regulation described above.

Moreover, the equipment in question may comprise, an active device, such as one or more hydraulic pumps placed in the duct connecting the two chambers or one or more compressors on the top of each chamber that activated are able to increase or reduce the flow rate between the communicating chambers.

The configuration just described of the regulation equipment represents the preferred one for this equipment. The two chambers 52 and 54 connected together present in fact the peculiarity, as has been seen, of determining, in the presence of the flow between the two chambers, two resonance frequencies, and this affords the advantage of increasing the capacity of the system to adapt to the different conditions of the sea.

It should, however, be noted that the equipment described herein may, however, also present different configurations; for example, it may envisage three or four chambers for multidirectional systems.

Figure 2:
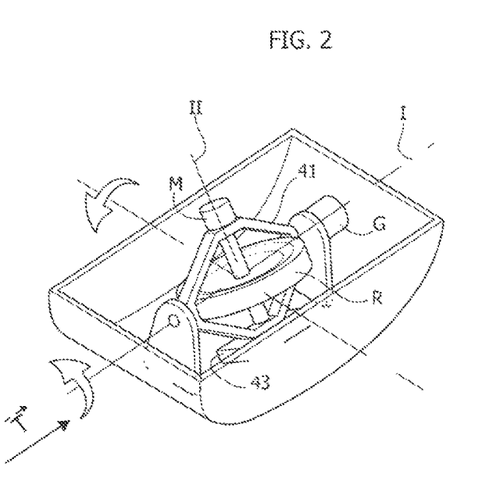
FIG. 2 is a schematic illustration of a gyroscopic structure of a preferred embodiment of the system described herein.

With reference now to the gyroscopic structure 4 of the system, it should first of all be noted that this is preferably with just one degree of freedom. Moreover, it is positioned on the body 2 according to an orientation such that the axis of rotation I is orthogonal to the axis of oscillation P of the body 2. This affords the advantage that the gyroscopic torque can, in this case, exert all its action for supplying the motion of precession about the aforesaid axis. In this connection, FIG. 2 illustrates a still of the gyroscopic structure during the motion of precession and indicated therein are also the vectors of some of the quantities representing the dynamics of the structure. It may be noted that the vector T of the gyroscopic torque is represented exactly along the same direction as that of the vector E of the velocity of the motion of precession and hence affects with its entire modulus the aforesaid vector of the velocity of the motion of precession.

In preferred embodiments, like in the illustrated one, the frame 41 carries a concentrated mass 43 which is preferably arranged below rotor R, and which has the function of limiting the range of the precession motion, particularly keeping the rotor within such a precession angle that the gyroscopic torque, at the time of the inversion of motion, is still sufficiently great to enable a ready and immediate re-starting of the motion.

In a way in itself known, the rotor R of the gyroscopic structure is governed in rotation by an electric motor M (see FIG. 2) in order to generate, that is, the gyroscopic forces that induce the motion of precession about the axis I. In various preferred embodiments of the system described herein, the system envisages variation of the speed of rotation of the rotor as a function of the specific conditions of the sea, in particular, also in this case, as a function of the frequency of oscillation of the wave motion.

In this connection, it should be noted, in fact, that this type of regulation enables modification of the resonance frequency of the system, just as the regulation made by the equipment described above, albeit to a more limited extent.

The present applicant has found that, by controlling the speed of the rotor it is possible to vary the frequency of the resonance peak significantly. As reference, it should be noted that in some experimental applications the variation obtained has been of approximately one second, i.e., less than half with respect to the variations that can be obtained via the regulation equipment described above.

In the light of the foregoing, in the system described herein it is hence possible to provide a control on the resonance frequency of the system, to bring it as close as possible, if not to a value equal, to the frequency of oscillation of the wave motion, through the dual intervention performed by the regulation equipment provided in the floating body, on the one hand, and by the control on the rotation of the rotor, on the other. The equipment enables variation of the resonance frequency for large differences, whereas control of the speed of the rotor enables fine regulation.

The system described herein evidently comprises a control unit configured for controlling the various devices and actuators of the system mentioned above so as to make the regulations referred to above.

With reference to the information regarding the frequency of oscillation of the wave motion, which is necessary for synchronising the system, this may be obtained by the control unit itself on the basis of data gathered via one or more accelerometers arranged on the floating body, or else it may be transmitted to the control unit by a purposely provided external instrument associated to the system, for example a wave meter set in the proximity of the system. Possibly, the control unit may also use information transmitted by weather-forecast centres, in the case where it is envisaged to implement control strategies in which the system sets itself initially in the condition pre-established for the state of wave motion of the sea indicated by the weather-forecast centre, and then modifies the above condition as a function of the updated data coming from the accelerometers or else from the wave meter associated to the system.

Figure 1:
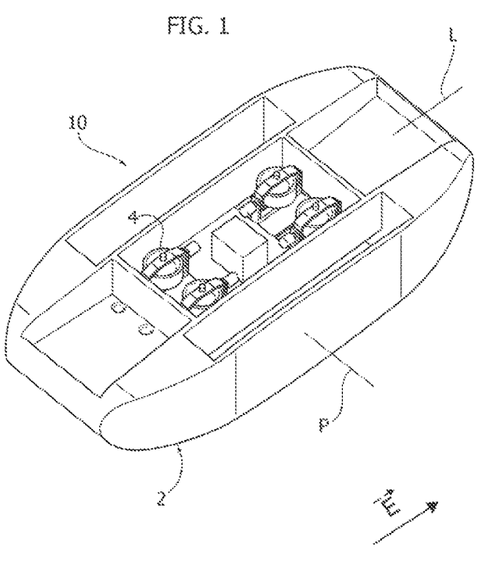
FIG. 1 illustrates an embodiment of the system described herein in perspective view.
Figure 6:
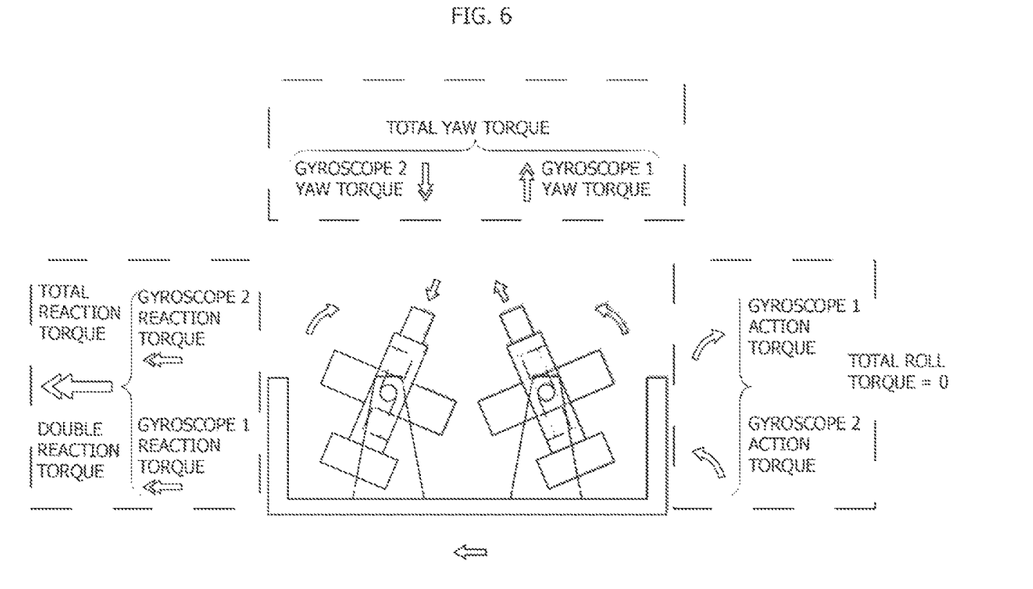
FIG. 6 is a schematic illustration of an operating mode of the system described herein.

In various preferred embodiments, as in the one illustrated, the system 10 has as a whole a plurality of gyroscopic structures 4, which are located in a central region of the body 2 and are arranged in a symmetrical way with respect to the two main axes P and L of the body (see FIG. 1). As regards the symmetrical arrangement of the gyroscopic structures with respect to the longitudinal axis L, it is pointed out that it is preferable to get the structures that are set at the opposite sides of the axis L to operate in perfect phase opposition (see FIG. 6) so that the respective reactions exerted on the floating body counterbalance one another. To obtain this operating mode, it is sufficient for the control unit to govern the rotations of the respective rotors R in opposite directions.

Figure 7:
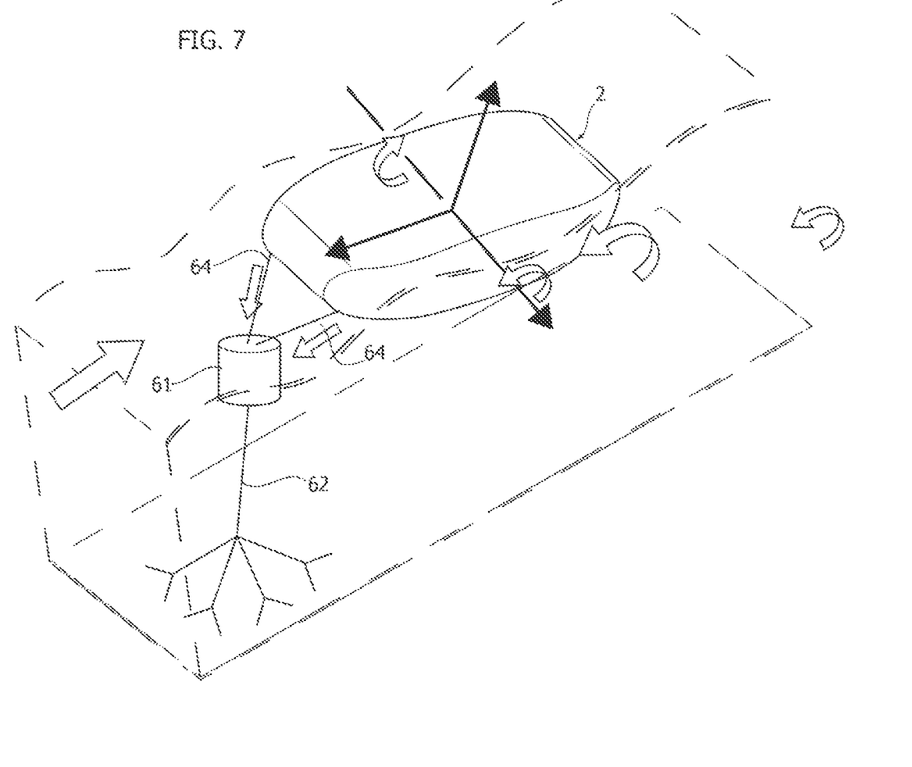
FIG. 7 represents an example of a modes of installation of the system described herein.

Finally, as anticipated above, FIG. 7 illustrates an example of a system for anchorage of the generating system 10, which can enable the latter to orient itself automatically with respect to the wave front. The anchorage system in question has a submerged body 61, which is anchored to the seabed via a single connection line 62, for example a chain, and which connects, instead, up to the body 2 through two connection lines 64, constrained to the body 2 in two symmetrical points of the stern region thereof. This system leaves the body 2 substantially free to turn about the point of constraint on the seabed, under the thrust of the wave front, and, thanks to the shape of its hull, sets itself so that the main axis of oscillation P is orthogonal to the direction of advance of the wave front.

Of course, without prejudice to the principle of the invention, the details of construction and the embodiments may vary, even significantly, with respect to what is illustrated herein purely by way of non-limiting example, without thereby departing from the scope of the invention, as defined by the annexed claims. For example, the electrical-energy generating device of the system may be provided with a pendulum-like structure or with a rotary structure, instead of the above-illustrated gyroscopic structure.

The invention claimed is:

1. A system for generating electrical energy from the wave motion of the sea, comprising:
   a floating body, designed to oscillate about a main axis of oscillation; and
   an electrical-energy generating device which is set on said floating body and which comprises a body that is configured to move as a result of an oscillation of said floating body about said main axis, and electric-generating means configured to generate electrical energy as a result of the movement of said body;
   said floating body comprising equipment provided with at least one chamber containing a variable volume of liquid material controlled by a regulation device to vary a frequency of a resonance peak of said system with respect to a movement of oscillation of said body about said main axis; and
   a control unit configured for controlling said regulation device so as to regulate said frequency of the resonance peak towards or on a value substantially corresponding to a frequency of oscillation of the wave motion;
   said system comprising a first chamber and a second chamber, which contain said material and are hydraulically connected together so that, as a result of said movement of oscillation about said main axis, said liquid material displaces at least partially from said first chamber to said second chamber, and vice versa:
   said regulation device configured for regulating the flow of said material from said first chamber to said second chamber, and vice versa; and
   wherein said control unit is configured for controlling said regulation device as a function of said frequency of oscillation of the wave motion; and
   wherein said system comprises at least one acceleration sensor, and said control unit is configured for controlling said regulation device on the basis of an acceleration signal transmitted by said sensor.

2. The system according to claim 1, wherein said control unit is configured for receiving a signal indicating said frequency of oscillation of the wave motion from an external device or from a weather-forecast centre.

3. The system according to claim 1, wherein said electrical-energy generating device is a gyroscopic structure which comprises a frame rotatably mounted on the floating body so that said frame can rotate about a first axis of rotation, and carrying a rotor, which is in turn rotatable about a second axis of rotation.

4. The system of claim 3, comprising an electric motor designed to drive in rotation said rotor, wherein said control unit is configured for controlling said motor as a function of said frequency of oscillation of the wave motion so as to regulate the value of the frequency of the resonance peak of the system towards or on a value substantially corresponding to the frequency of oscillation of the wave motion.

5. The system according to claim 1, wherein said equipment comprises, for each chamber, a device designed to vary the level of said material within said chamber, and wherein said control unit is configured for controlling said device as a function of said frequency of oscillation of the wave motion so as to regulate the value of the frequency of the resonance peak of the system towards or on a value substantially corresponding to the frequency of oscillation of the wave motion.

6. The system according to claim 1, wherein said device is constituted by a valve set along the duct for connection of said first and second chambers.

7. The system according to claim 1, wherein said device is constituted by a valve designed to control communication of said chamber with the external atmospheric pressure.

8. The system according to claim 1, wherein said device is constituted by an active device, such as a pump or a compressor, placed in the duct or on the top of the chamber, respectively, designed to increase the flow rate of liquid material between the two chambers.

9. The system according to claim 1, wherein said gyroscopic structure is with just one degree of freedom.

10. The system of claim 3, wherein said frame carries a concentrated mass that is positioned above or below said rotor to limit a range of a precession angle of the rotor such that a gyroscopic torque at a time of an inversion of the motion is sufficiently large to enable a restarting of the motion.

* * * * *